(No Model.)

E. R. ALLEN.
POTATO DIGGER.

No. 574,128. Patented Dec. 29, 1896.

Witnesses
A. S. Diven
H. H. Mills

Inventor
Edward R. Allen
by Eugene Diven
Attorney

UNITED STATES PATENT OFFICE.

EDWARD R. ALLEN, OF CORNING, NEW YORK.

POTATO-DIGGER.

SPECIFICATION forming part of Letters Patent No. 574,128, dated December 29, 1896.

Application filed March 21, 1896. Serial No. 584,335. (No model.)

*To all whom it may concern:*

Be it known that I, EDWARD R. ALLEN, a citizen of the United States, residing at Corning, in the county of Steuben and State of New York, have invented certain new and useful Improvements in Potato-Diggers, of which the following is a specification.

My invention relates to improvements in potato-diggers in which the plow-point is carried by a wheeled frame drawn by horses and in which the potatoes and earth, after being lifted by the plow-point, are separated, the potatoes being thrown to one side by a rapidly-rotating reel, where they are caught by a suitable screen and deposited in rows at the side of the digger; and the objects of my improvement are, first, to provide the plow-point with means for adjusting it vertically, so that it may be set to reach potatoes at the varying depths to which they grow in different kinds of soil; second, to provide independent means for setting the point at different desirable angles; third, to provide the reel with an adjustment up and down its driving-shaft, so that its periphery may always be set to come in line with the rear of the plow-point to whatever angle and elevation the point may be adjusted, and, fourth, to provide a rear wheel-truck that shall be adjustable upon the driving-shaft of the reel to follow the adjustment of the reel in order to keep the frame of the machine about level and at the same time to form an additional support to the driving-shaft. I attain these objects by the mechanism illustrated in the accompanying drawings, in which—

Figure 1:
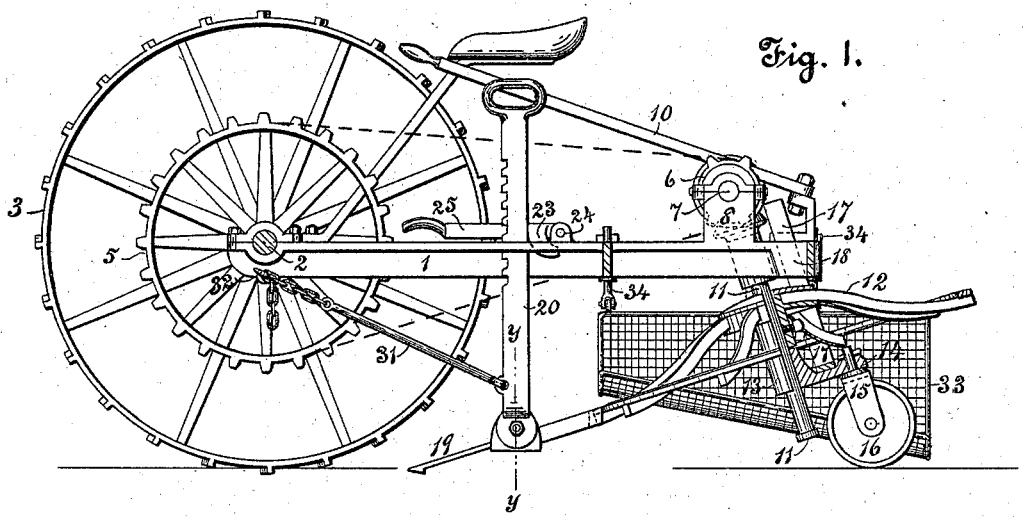
Figure 2:
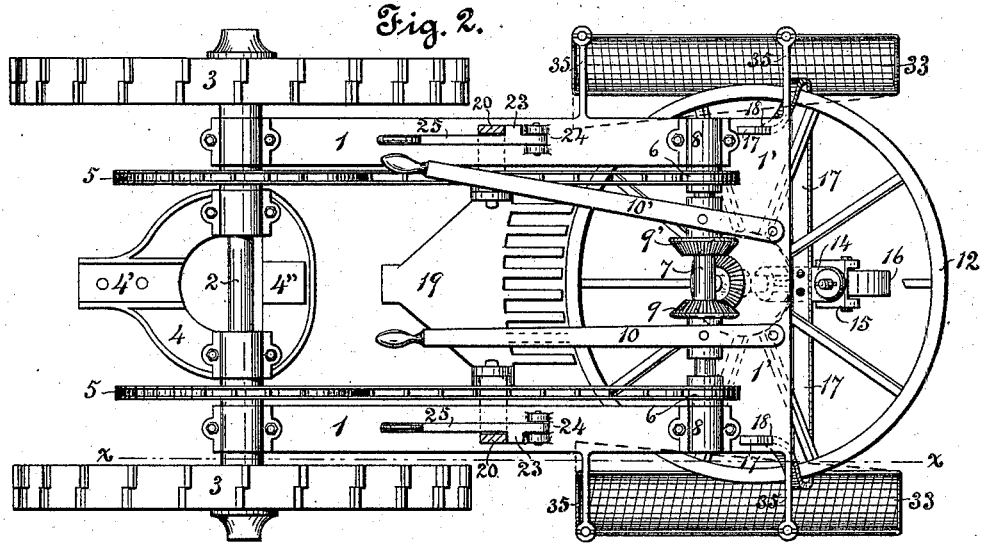
Figure 3:
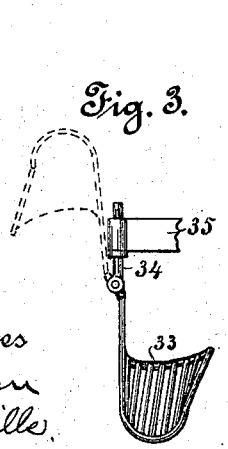
Figure 4:
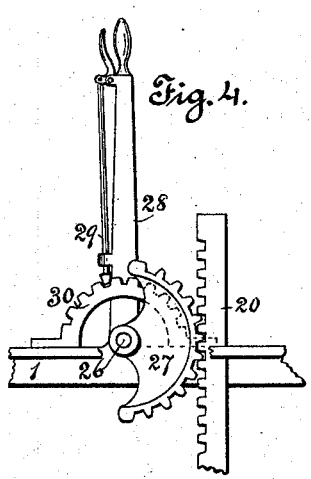
Figure 5:
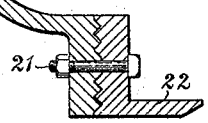

Figure 1 is a side elevation of the entire machine, parts being in section on the line $x$ $x$ in Fig. 2. Fig. 2 is a top view of the machine with the driver's seat removed. Fig 3 is a rear view of the screen, showing how it may be thrown up out of the way when not in use. Fig. 4 shows a preferred manner of adjusting the plow-point standards; and Fig. 5 is a vertical section on the line $y$ $y$ in Fig. 1, showing the angular adjustment for the plow-point.

Similar numerals refer to similar parts throughout the several views.

1 1 1' represent the main frame of the machine, which is of cast-iron of T or L shaped cross-sections and which is supported in front in suitable journal-boxes by the main shaft 2. to which are attached the traction-wheels 3 3. A pole-piece 4 is also supported upon this shaft by journal-boxes, the pole being attached to this piece at 4' and the driver's seat at 4". Two large sprocket-wheels 5 5 are driven by the shaft 2, and in turn drive the small sprocket-wheels 6 6 by suitable sprocket-chains. The sprocket-wheels 6 6 are keyed to the counter-shaft 7, which is supported by the journal-boxes 8 8 on the sides of the frame. The shifting bevel-gears 9 9' are driven by the counter-shaft 7, the levers 10 10' extending forward to within the driver's reach for the proper manipulation thereof, as hereinafter set forth.

A shaft 11, which has a backward slant, is held in a journal-box attached to the cross-piece 1' of the frame, and is driven by a bevel-gear which meshes with whichever it is desired of the gears 9 9'.

Upon the shaft 11 is located the reel 12, which consists of a number of arms attached to a central hub or head and having their outer ends connected by an annular flat ring attached to the top thereof. The reel is tilted up toward the rear by the inclination of the shaft 11, so that the potatoes after leaving the plow-point will be received on the reel nearly in line with the tilt of the point and will be carried upward and thrown to the side into the screen. The reel-head is adjustable up and down the shaft 11 and is held in proper position thereupon by a set-screw or other suitable connection.

Below the reel-head is located a truck consisting of a hub 13, within which the shaft 11 is free to turn, an arm 14 extending backward from this hub and having pivoted to its end the yoke 15, which carries the small rear wheel 16. On the top of the arm 14 is bolted the strap 17 of flat iron, which extends outward at either side thereof and is bent upward around the outer edge of the reel, then inward and upward again, where its ends are free to slide through slotted openings 18 in the frame as the truck is raised or lowered to accommodate itself to the adjustment of the reel-head or to unevenness in the ground.

In front of the reel is located the plow-point 19, which is provided at its rear with slats to form a screen through which earth and small stones will fall. This point is carried by the standards 20 20, to the ends of which it is joined by a friction-coupling. (Shown in cross-section in Fig. 5.) This coupling has its two parts provided with annular V-shaped ridges which intermesh. By this arrangement the point may be tilted at any angle and securely clamped in position by the bolt 21, the point being fastened to the piece 22 in Fig. 5. The standards run up through slots in the frame and are provided with teeth to engage ends of the slots to hold them in proper vertical adjustment. Cam-locks 23 23 are pivoted to the frame at 24 24 and provided with hand-levers 25 25. When thrown down, they hold the teeth of the standards against the slot ends and securely lock them in place. A means of adjustment that I prefer over this is shown in Fig. 4. Here a shaft 26 runs across between the sides of the frame, being properly journaled thereto, and has attached to its ends segment-gear 27, which mesh with rack-teeth on the standards. The shaft 26 is operated by one lever 28, provided with a latch 29, which locks into notches in the sector 30. By this arrangement both standards are raised at once and evenly by the manipulation of one lever.

The draw-rods 31 are attached to the eyes at the lower part of the standards and are provided at their forward ends with lengths of chain, the links of which are hooked over a hook 32, fastened to the frame, as indicated. The draw-rods hold the standards against the backward pull as the point is drawn through the earth, and the links of the chain allow the rods to be lengthened or shortened to conform to the vertical adjustment of the plow-point.

At either side of the rear of the machine and properly located in reference to the reel are the screens 33 33, which are turned up at the bottom and slanted to form chutes. These screens are coupled by hinged joints to the bolts 34, which pass up through suitable sockets in the arms 35, projecting from the frame, keys being driven into slots in the bolts to hold them in place. This construction is shown more clearly in Fig. 3, which indicates in broken lines how the screens are thrown up out of the way when not in use, suitable means being provided to hold them in place.

In Fig. 3 I have shown a different kind of screen from that shown in Figs. 1 and 2 and also a different formation of the chute. A screen made of woven wire, such as shown in Figs. 1 and 2, is apt to become clogged with weeds when the digger is used in a field where weeds are plentiful, and in order to avoid the difficulty I make the screen of parallel rods properly supported. This allows the weeds that are thrown into the chute to slide down and out from it without hindrance. By flattening the forward part of the chute I bring its inside edge closer to the reel at the point where most of the potatoes are thrown from the reel, and it also presents a broader surface upon which they may fall. The broken lines in Fig. 2 indicate the position of this form of chute.

The chute is slightly curved at the front and highest part, becoming gradually more curved as it descends, until it is half round at the rear and lowest point.

In order to allow the screen to rise in case it comes into contact with stones or other obstacles, I may leave off the collar on the bolts 34, so that they may be pushed up in their sockets when the screen rises in passing over such obstacles.

The operation of my potato-digger is as follows: The operator, starting in at one end of the field, (the left end looking toward the front of the machine as it is shown set,) drives in with the wheels 3 3 running in the furrows between the rows. The point is adjusted vertically to reach the lowest growing potatoes and angularly to offer the least necessary resistance as the earth is plowed up. The reel is then adjusted on its shaft so that the top of the annular ring comes even with the top of the slats at the rear of the plow-point. The levers 10 10' are then shifted to the right, which throws bevel-gear 9 into mesh with the gear on shaft 11 and drives the reel around to the left as soon as the machine is started. As the machine moves along earth, stones, and potatoes are plowed up, the earth and small stones and small useless potatoes dropping through the slats, the larger potatoes and stones being pushed on upon the rapidly-rotating reel. Most of the stones, being heavy, fall through the reel; but the potatoes are caught and given a centrifugal impulse which throws them against the screen at the left, where they slide down the chute and are deposited in a clean row behind and to the left of the machine to be gathered afterward by the pickers-up. Any dirt that is carried over is sifted through the coarse meshes of the screen. The ring at the periphery of the reel plays an important part, as it prevents stones from becoming caught between the slats and the reel-spokes, which would break one or the other or stop the machine. I also find that the best results are obtained where this ring is adjusted so as to have its top in line with the top of the point-slats. When the end of the row is reached, the operator turns around and brings the plow-point into line with the next row of potatoes in the field. This brings his right side toward the potatoes already dug, and he shifts the levers 10 10' so as to throw gear 9' into mesh with the gear on shaft 11 to drive the reel around to the right. This deposits a row of potatoes parallel to those first dug, and thus the complete field is plowed over, passing back and forth and taking each row in succession.

It will be noticed that while my wheel-truck is free to move up and down the shaft 11, it is guided by the slots in the frame through which the ends of the strap 17 pass and prevented from putting a backward or forward strain upon the shaft 11, forming in fact a support for the lower portion of said shaft. The wheel is pivoted to the arm 14 to allow it to turn when the whole machine is turned about.

I am aware that I am not the first to use an adjustable point and reel, also that I am not the first to use the side screens into which the potatoes are thrown. I believe, however, that the independent adjustments that I have described are novel and give beneficial results, and I do not therefore wish to be confined to the specific methods of making such adjustments that have been herein set forth.

What I do claim as my invention, and desire to secure by Letters Patent, is—

1. In a potato-digger, a plow-point provided with independent vertical and angular adjustments, in combination with a reel of the form described at the rear thereof upon an inclined shaft, the location of the reel being such that its periphery just clears the rear edge of the plow-point, its inclination being approximately that of the plow-point, and means for adjusting the reel upon the shaft to preserve this relation of the parts whatever may be the required vertical or angular adjustment of the plow-point.

2. In a potato-digger, the combination of a plow-point, standards for supporting said plow-point depending from the frame of the machine, couplings between the plow-point and the feet of the standards whereby the point is held at any desired angular adjustment, means for adjusting the standards vertically, a rearwardly-inclined shaft depending from the frame and adapted to be driven by the wheels of the machine, and a reel upon the shaft provided with a flat ring or rim fastened to its arms at their outer extremities, said reel being close to the rear of the plow-point and being also adjustable upon its shaft in order that its rim may be set approximately in line with the top of the plow-point whatever may be the required angular or vertical adjustment of the point.

3. In a potato-digger, the combination of an adjustable plow-point supported from the frame of the machine, an inclined reel at the rear of the plow-point mounted upon a rearwardly-inclined shaft, a wheel-truck for supporting the rear portion of the machine beneath the reel, a strap fastened to the wheel-truck and extending outward on either side of the reel thence upward around the reel and having its end portions passed through slots on either side of the frame, and means for holding the reel and wheel-truck in proper adjustment to conform with the adjustment of the plow-point.

4. In a potato-digger, a reel-shaft inclined rearwardly from the rear of the machine, a hub loose upon the shaft beneath the reel-head, an arm extending backward from the hub, a yoke pivoted to the arm, a small wheel in the yoke, and a strap fastened to the arm and extending outward to either side of the reel thence upward around the reel and having its ends passed freely through slots on either side of the frame, all combined substantially as shown and for the purpose set forth.

5. In a potato-digger, the combination of a main shaft driven by the forward wheels of the machine, a counter-shaft driven by the main shaft, two bevel-gears on the counter-shaft, means for shifting the gears, a third shaft rearwardly inclined and provided with a pinion to mesh with one or the other of the gears on the counter-shaft, a reel of the form described on the inclined shaft, an adjustable wheel-truck for supporting the rear of the machine beneath the reel, a plow-point supported by standards in front of the reel, means for adjusting the plow-point vertically and angularly and the reel relatively thereto in the manner and for the purpose described, and a suitable frame by which all the parts are supported and connected substantially as shown and described.

6. In a potato-digger, a screen adapted to be hung at one side of the machine to receive the potatoes from the reel, said screen consisting of a vertical portion and a turned-over portion at the bottom having a backward slant to form a chute, the vertical portion being provided with hinged couplings at its top whereby the entire screen may be turned up out of the way when not in use.

7. In a potato-digger, a screen adapted to be hung at one side of the machine to receive the potatoes from the reel, the lower portion of the screen being turned over with a backward slant to form a chute, and the chute being broad and shallow forward and growing gradually narrower and deeper toward the rear, substantially as shown and for the purpose set forth.

In testimony whereof I hereunto affix my signature in presence of two witnesses.

EDWARD R. ALLEN.

Witnesses:
A. S. DIVEN, 2d,
H. H. MILLS.